W. BOWKER.
MOTOR VEHICLE STEERING GEAR.
APPLICATION FILED APR. 18, 1922.

1,438,809.

Patented Dec. 12, 1922.
2 SHEETS—SHEET 1.

Inventor
W. Bowker
By
Attorney

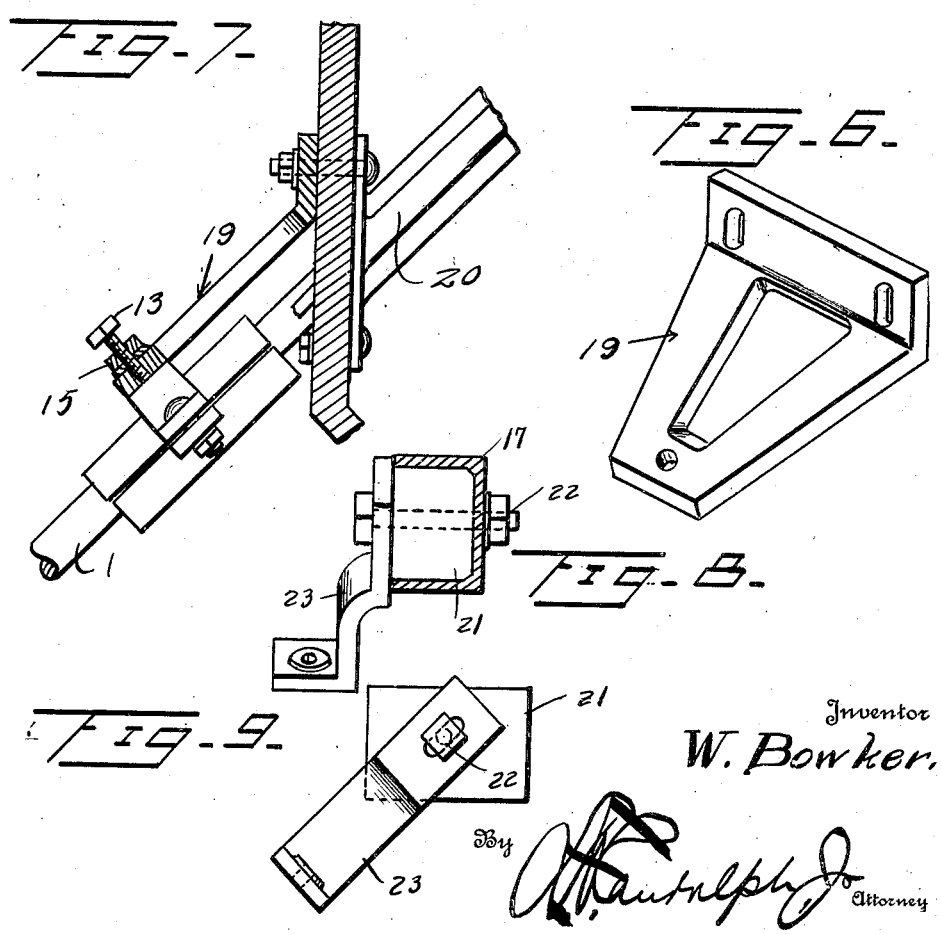

Patented Dec. 12, 1922.

1,438,809

UNITED STATES PATENT OFFICE.

WILLIAM BOWKER, OF CENTERVILLE, RHODE ISLAND.

MOTOR-VEHICLE STEERING GEAR.

Application filed April 18, 1922. Serial No. 554,583.

*To all whom it may concern:*

Be it known that I, WILLIAM BOWKER, a citizen of the United States, residing at Centerville, in the county of Kent and State of Rhode Island, have invented certain new and useful Improvements in Motor-Vehicle Steering Gears; and I do hereby declare the following to be a full, clear, and exact description of the invention, such as will enable others skilled in the art to which it appertains to make and use the same.

This invention has relation to the steering gear of motor vehicles and more particularly to the type in which the steering rod has direct connection with the link connecting the arms of the steering knuckles, and has for its object to facilitate the steering and to materially reduce the energy required to be expended in the manipulation of steering gear of the character aforesaid.

The invention furthermore aims to provide an attachment whereby it is possible to release the steering wheel with a degree of safety and assurance that the same will not move to the right or left and result in a casualty such as is the case when the hands are removed from the steering wheel of light motor vehicles in which the steering rod has direct connection with the link connecting the arms of the steering knuckles.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be restorted to without departing from the nature of the invention.

Figure 1:
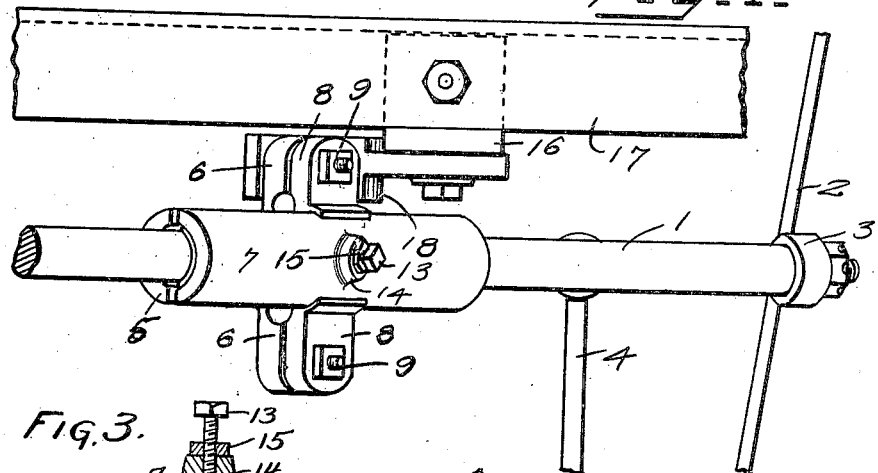
Figure 3:
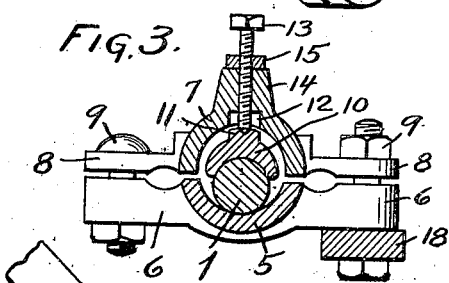
Figure 2:
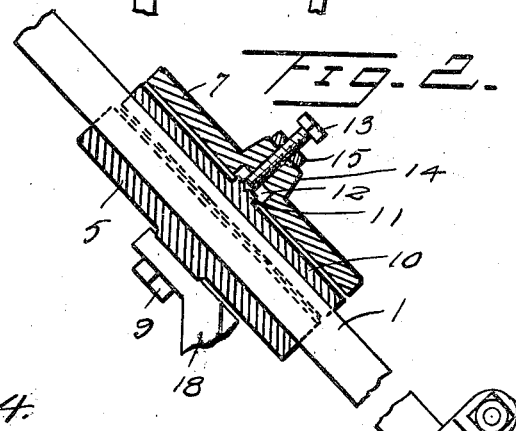
Figure 4:
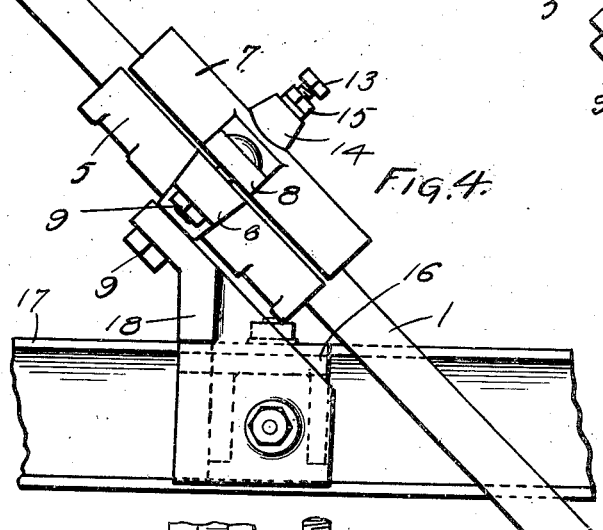
Figure 5:
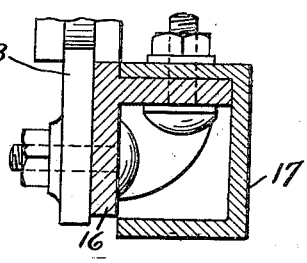

Referring to the accompanying drawings forming a part of the application,

Figure 1 is a detail view of portion of the steering gear of a Ford machine, illustrating the application of the invention, Figure 2 is a longitudinal section through the tensioning device receiving and coacting with the steering rod, a portion of the latter being shown in full lines, Figure 3 is a transverse section of the parts illustrated in Figure 2, showing a portion of the bracket to which the tensioning device is attached, Figure 4 is a side view of the attachment, Figure 5 is a transverse section on the line 5—5 of Figure 4, Figure 6 is a detail view of a modified form of supporting means for the tensioning device, Figure 7 is a sectional detail of the modification, Figure 8 is a detail view of a further modified form of attachment, and Figure 9 is a side view thereof.

Corresponding and like parts are referred to in the following description and designated in the several views of the drawings by like reference characters.

The numeral 1 designates the steering rod of a light motor vehicle, such as a Ford machine. The numeral 2 designates the link which connects the arms of the steering knuckles and 3 is the arm fast to the lower end of the steering rod 1 and connected by means of a rod 4 with the link 2. These parts are of well known construction and arrangement and are illustrated to demonstrate the application of the present invention.

The device comprises a sectional sleeve which is longitudinally divided to form similar or complemental parts. The lower section or part of the sleeve is designated by the numeral 5 and is provided midway of its ends with offstanding ears 6. The top section or part is designated by the numeral 7 and is formed with offstanding ears 8 in position to register with the ears 6 of the part 5, said ears being apertured to receive bolts 9 by means of which the sections or parts are made secure when assembled. A follower 10 is disposed within the sleeve and is preferably located within the part or section 5 and is of semicircular form in cross section and of a length corresponding with the length of the sleeve. The steering rod 1 is disposed between the follower 10 and the section or part 7 and is gripped therebetween with a greater or less degree of pressure according to the resistance to be offered to the turning of the steering rod. The follower 10 is formed with a boss 11 which enters a recess 12 in the inner side of the section or part 7, whereby to prevent displacement of the follower both laterally and longitudinally. A set screw 13, mounted in a boss 14 of the part 7, has its inner end in engagement with the boss 11 and operates to adjust the follower 10 to effect a gripping of the steering rod 1 with a greater or less degree of pressure, as required. A jam nut 15, mounted upon the set screw 13, secures the latter in the adjusted position. The tensioning device may be secured to a convenient part of the machine in any approved way, two means being illustrated in the accompanying drawings.

When the device is connected directly to the frame of the machine, a bracket 16 is provided and one member is bolted to a side bar 17 adjacent the steering rod 1. A second bracket 18 is bolted or otherwise fastened to the other member of the bracket 16 and its arm is attached to the sectional sleeve by one of the bolts 9. In this manner, the tensioning device is made fast and the steering rod 1 passing through the sectional sleeve may have the resistance to its turning regulated as required by adjusting the set screw 13 to advance the follower 10 more or less, whereby to regulate the gripping action of the parts 10 and 5 upon the steering rod passing therebetween.

In the modification shown in Figures 6 and 7, a single bracket 19 is provided and is attached to the dash preferably by two of the bolts which connect the base plate of the steering column 20 to the dash. The sectional sleeve is attached to the opposite end of the bracket 19 by means of the set screw 13 and the jam nut, said bracket being clamped between the part 7 of the sectional sleeve and the jam nut 15. In this arrangement, the set screw 13 performs a double office, one of adjusting the follower 10 and the other of securing the tensioning device to the bracket 19.

In the modification shown in Figures 8 and 9, a block 21 is adapted to be fitted snugly within the hollow side of the longitudinal frame bar 17 and is made secure by means of a bolt 22. A bracket 23 is secured to the side bar 17 and block 21 by means of the bolt 22 and the tensioning device is adapted to be secured to the free end of the bracket 23 in the manner substantially as herein indicated.

It will be understood from the foregoing that the device provides means whereby the resistance to the turning of the steering rod 1 may be regulated as required, thereby preventing a too free turning thereof so that the steering rod will remain in the position set when the hands are removed from the steering wheel with the result that a casualty is averted, since the steering wheel of the machine will not move when meeting with an obstruction, or dropping into a rut, or engaging a sandy surface.

What is claimed is:

1. In motor vehicle steering gear, and in combination with the steering rod, a sectional sleeve, a follower within the sectional sleeve, and a set screw threaded into a member of the sectional sleeve and adapted to adjust the follower to vary its gripping action on the steering rod.

2. In motor vehicle steering gear, and in combination with the steering rod, a sectional sleeve, means for connecting the sections of the sleeve when assembled, a follower within the sleeve, positive connecting means between the follower and sleeve including a recess and projection, and a set screw threaded into a part of the sleeve and adapted to adjust the follower to vary its gripping action on the steering rod.

In testimony whereof I affix my signature in presence of two witnesses.

WILLIAM BOWKER.

Witnesses:
 IRVING WEIDMILLER,
 EARL S. WOOD.